United States Patent
McWhorter

[11] Patent Number: 5,134,849
[45] Date of Patent: Aug. 4, 1992

[54] ENGINE GAS EJECTOR EXHAUST SYSTEM

[76] Inventor: Edward M. McWhorter, 6931 Greenbrook Cir., Citrus Heights, Calif. 95621

[21] Appl. No.: 798,162

[22] Filed: Nov. 26, 1991

[51] Int. Cl.⁵ .............................................. F01N 3/10
[52] U.S. Cl. ...................................................... 60/304
[58] Field of Search ............................ 60/304, 305, 307

[56] References Cited

U.S. PATENT DOCUMENTS

| | | | |
|---|---|---|---|
| 1,897,746 | 2/1933 | Winslow | 60/304 |
| 3,468,124 | 9/1969 | Hraboweckyj | 60/305 |
| 4,108,119 | 8/1978 | McWhorter | 60/307 |
| 4,248,199 | 2/1981 | McWhorter | 60/307 X |
| 4,312,313 | 1/1982 | McWhorter | 60/304 X |

Primary Examiner—Allen M. Ostrager

[57] ABSTRACT

The invention relates to new and useful improvements in the design of combustion gas ejector systems and in particular to those types of ejector systems employed on piston driven internal combustion engines. The invention provides a method of efficiently collecting the exhaust flow from a plurality of engine cylinder sideport ejector nozzles into a single ejector diffuser duct of the gas ejector.

7 Claims, 2 Drawing Sheets

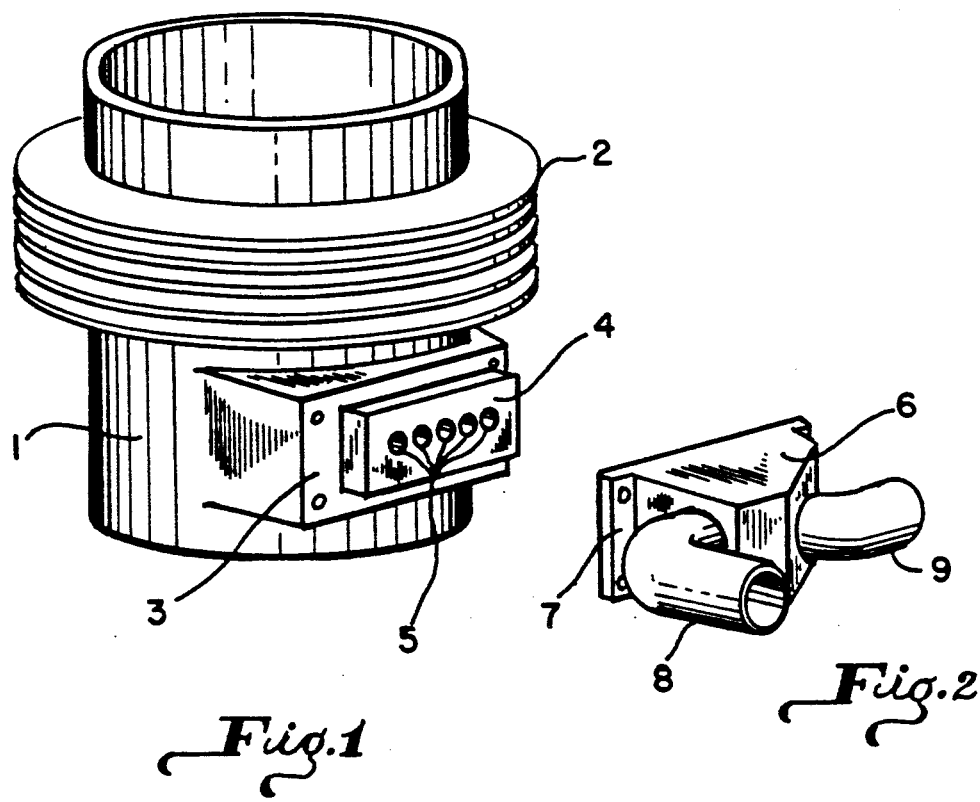
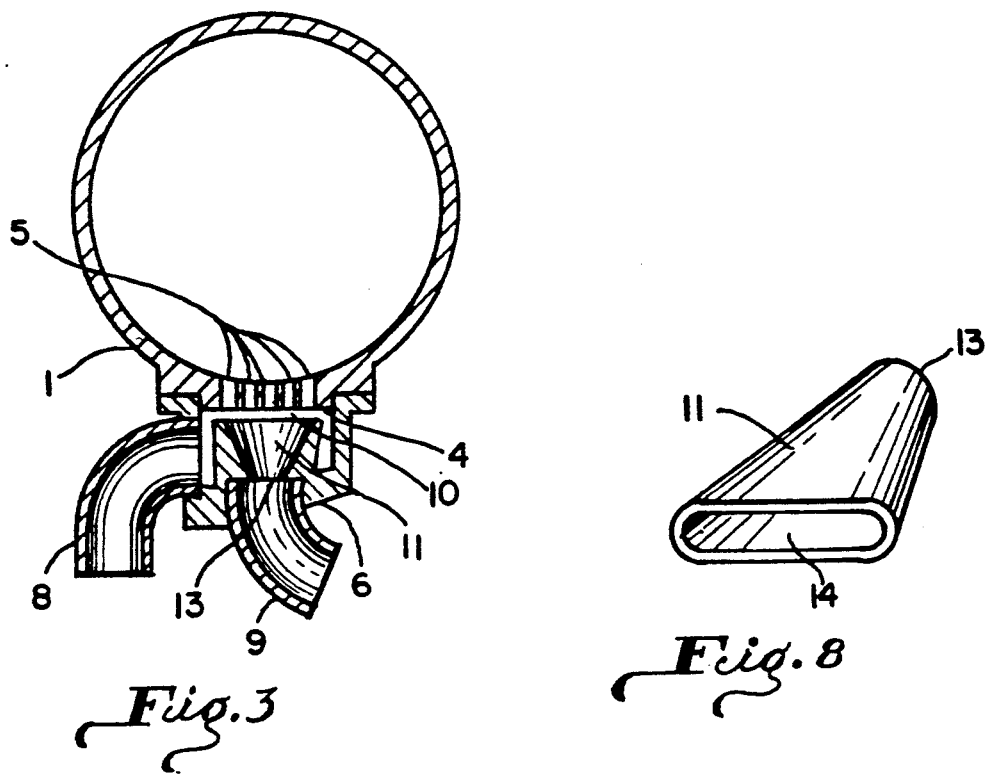

ENGINE GAS EJECTOR EXHAUST SYSTEM

CROSS REFERENCE

This application presents new and useful improvements of my U.S. Pat. Nos. 4,108,119, 4,248,199 and 4,312,313.

BACKGROUND OF THE INVENTION

1. Field of the Invention

The invention relates to the induction and exhaust processes of piston driven internal combustion engines which operate on either two-stroke or four-stroke principle. In particular the invention provides new and useful improvements to those types of engine systems employing gas ejectors at cylinder side ports which serve to separate the alternating flow of induction air and exhaust gas streams to and from a common cylinder port.

2. Description of Prior Art

The earliest studies of the alternating flow of air and exhaust products through combustion cylinder side-ports were undertaken in the design of the two-stroke engine systems. The most significant of these early engine designs, as they apply to this application, was the self-induction system, or as it is sometimes referred to, the harmonic-induction system, which employed a plurality of manifolded side-ports upon the engine cylinder located on a horizontal plane near the point of bottom dead center of piston travel. The manifold was connected to a length of short pipe which suddenly opened into a larger axially aligned pipe called a "stepping pipe". Flow resistance in the small pipe caused a slightly higher positive pressure during the exhaust cycle and for a short period of time, a negative pressure during the induction cycle. Pressure waves were created in the stepping pipe by the opening and closing of the cylinder port by the engine piston, the distance of spacing permitting the induction valve, located in the cylinder head to remain open for a longer period of time thereby improving the engine volumetric efficiency. In this respect, the gas ejector collector diffuser duct acts as the small pipe, and its sudden opening into the larger diameter exhaust pipe, as shown in FIG. 4 of U.S. Pat. No. 4,248,199, presented in the Cross Reference, acts as the large pipe creating a stepping pipe, as described above. However, the gas ejector collector diffuser duct in this instance is of a generally convergent configuration such that the sonic exhaust gas flowing from the gas ejector nozzles are slightly compressed within it by the exhaust gas stream momentum as it slows down. The periodic and sudden expansion of the exhaust gases from the diffuser duct into the larger diameter exhaust pipe, in a sequential manner corresponding to the cyclic covering and uncovering of the engine cylinder side-port by the reciprocating engine piston, create a series of pressure waves in the exhaust pipe which travel primarily in a unidirectional pressure pulse toward the exhaust pipe outlet.

The direction of flow through the ejector nozzles changes with each alternate stroke of the engine piston. Combustion gases flow from the engine cylinder through the ejector nozzle across the intervening receiver volume into the collector diffuser duct during the exhaust stroke. On the subsequent induction stroke the flow through the ejector nozzle is reversed and air from the receiver volume flows into the engine cylinder through the ejector nozzle. The present invention deals only with the combustion gas flow through the exhaust circuit comprising the ejector nozzle and the collector diffuser duct. The unique feature of the present invention is the use of a single diffuser duct to efficiently collect the exhaust flow of a plurality of ejector nozzles.

In the present invention, as is the case of the Cross Referenced patents, the engine cylinder side-port is that portion of the port that opens into the engine cylinder volume forming also the inlet of the gas ejector nozzle. The gas ejector nozzle, as taught in U.S. Pat. No. 4,312,313 presented in the Cross Reference, are shown as being formed from the material thickness of the engine cylinder wall. In other designs the ejector nozzle is shown to be formed separately as an insert referred to as a jet, and placed over the side-port as taught in the Cross-Referenced U.S. Pat. No. 4,248,199. In the present invention the gas ejector nozzle will be shown as being formed from the material comprising the cylinder wall. The ejector nozzle of the present invention could also be formed as a separate insert and placed over the engine cylinder side-port, as in the above U.S. Pat. No. 4,248,199 without effecting the unique feature of the present design.

Other investigators have shown that in the design of the engine cylinder side-port of the two-stroke engine, the shape of the cylinder side-port will effect the rate of its opening and closing relative to the linear motion of the engine piston moving past it. A square, or rectangular side-port, will have a linear opening rate and the increase of flow during the opening will be somewhat constant. A circular, or oval shaped side-port, will have a constantly variable opening rate as the engine piston uncovers it. The most efficient gas ejector operation is achieved when the side-port opening rate is rapid and the flow through it is vigorous. Therefore, larger side-port openings are desirable, but these must be kept within a practical design range which permits the engine piston ring to pass over them without expanding into the openings causing wear or damage. In larger engine designs, where a single side-port is not sufficient, a plurality of side-ports are used in order to achieve the desired flow area necessary to accommodate the greater flow volumes of exhaust gases from such engines. The present invention provides a new and useful method of collecting the flow from a plurality of side-ports. In the present invention it is assumed the ejector port will be of such a configuration, and the ejector nozzle flow surfaces formed in such a manner, as to permit the rapid opening rate and least resistance to flow, and these features do not constitute the unique features of the present invention. The present invention directs attention toward the orientation of the ejector nozzle exit plane and its general effect upon the expansion wave within the ejector receiver when a plurality of engine cylinder side-ports are employed in the design.

The gas ejector nozzle flow axis, regardless of the shape and configuration of its internal flow channel, is assumed to be a line passing through the center of the nozzle inlet and exit planes. The initial flow of the combustion gases from the ejector nozzle exit plane are sonic. When the flow axis of the ejector nozzle enters the receiver obliquely, the nozzle exit plane is not perpendicular to the nozzle flow axis. Therefore, the combustion gas expansion wave entering the receiver volume is skewed from the ejector nozzle flow axis toward the shortest length of the nozzle at a point on the exit plane. The flow pattern and the degree to which the flow Is skewed may be considered as approximately that generated by a succession of Prantle-Meyer expansions about this point. The general effect of the oblique exit plane is to scatter the flow and decrease the concentrated impact and thus weaken the momentum exchange between the air in the receiver volume and make the overall gas ejector operation less effective. The most concentrated flow from the ejector nozzle, and therefore the most vigorous, occur when the ejector nozzle exit plane is perpendicular to its flow axis and the established flow within the nozzle flow channel is streamlined and not turbulent. Making the ejector nozzle exit plane perpendicular to its flow axis is a consideration of the present invention.

The relative orientation of a plurality of ejector nozzle flow axis constitute three general types of flow entering the ejector receiver. When the ejector nozzle flow axis is directed toward the engine cylinder axial center such that a plurality of such ejector nozzles axes form a radial fan pattern, the orientation of their flow within the ejector receiver is said to be radial. Radial flow systems require larger receiver volumes in order to accommodate the flow. When the ejector nozzle flow axis is directed perpendicularly to a horizontal line passing through the axial center of the engine cylinder, such that a plurality of such ejector nozzles form a series of parallel flow axes, the orientation of their flow axes within the ejector receiver is said to be parallel. The flow axis of parallel flow systems are more closely bunched than the radial system described above and therefore the ejector receiver may be made smaller. When the ejector nozzle flow axis is directed obliquely to a horizontal plane perpendicular to the axial center of the engine cylinder such that a plurality of ejector nozzles form a series of obliquely aligned flow axis entering the ejector receiver the flow is said to be oblique. The flow-axis of the obliquely flowing systems may be parallel with each other or they may be made to impinge at some point in the ejector receiver or above the ejector receiver, in which case their flow axes are said to be either parallel or obliquely impinging. The most efficient ejector operation is achieved within the smallest ejector receiver volume with the obliquely impinging axial flow alignment of the ejector nozzles.

SUMMARY OF THE INVENTION

It is the primary object of the invention to reduce the size and complication of manufacture of engine gas ejector systems by collecting the flow from a plurality of gas ejector nozzles into a single diffuser duct.

It is yet another object of the invention to alleviate the difficulty of collecting flow from the obliquely formed side-ports by causing a plurality of such obliquely aligned nozzles to be directed toward a single diffuser section.

It is still another object of the invention to reduce the weight of engine gas ejector systems and thus improve the power/weight ratio of the engine itself.

And still another object of the invention is to lower the manufacturing cost of engine gas ejector systems by simplification of the design and by decreasing the number of component parts in its assembly.

All of the foregoing and further objects and advantages of the invention will become apparent from the study of the drawings and detailed descriptions herein provided.

BRIEF DESCRIPTION OF THE DRAWINGS

There are presented as part of the specification, drawings showing the major elements of the improved engine ejector system and the general manner of its operation.

FIG. 1 is a perspective drawing of the engine cylinder.

FIG. 2 is as perspective drawing of the engine ejector system.

FIG. 3 is a cross-section of the engine cylinder and ejector through the ejector nozzles whose flow axes are parallel.

FIG. 8 is a perspective view of a typical collector diffuser duct.

DESCRIPTION OF THE PREFERRED EMBODIMENT

Figure 4:
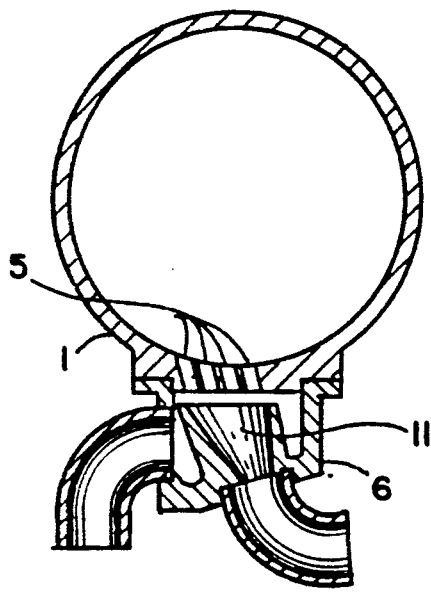
FIG. 4 is a cross-section of the engine cylinder and ejector through the ejector nozzles whose flow axes are obliquely parallel.

Referring now to the drawings and to FIG. 1 thereof in particular which is a perspective view of an air cooled cylinder of an engine system comprising a plurality of such cylinders. The engine cylinder shown in FIG. 1 comprises engine cylinder 1, having a plurality of cooling fins 2, an ejector mounting surface 3, an ejector nozzle surface 4, and a plurality of ejector nozzles 5. Those skilled in the art can recognize the fact that a water cooling jacket could be placed over cylinder 1 to achieve the same purpose as the cooling fins 2 without detracting from the unique features of the design.

Turning now to FIG. 2 which is a perspective of the ejector showing the exterior comprising a receiver housing 6, a mounting flange 7, air duct 8, and exhaust duct 9.

Turning now to FIG. 3 which is a cross-section of engine cylinder 1 and the ejector housing 6 taken through the ejector nozzles 5 plane. In FIG. 3 the ejector nozzle flow axes are parallel and their exit planes entering the receiver volume 10 is perpendicular to ejector nozzle surface 4. The ejector nozzle flow axes of the five ejector nozzles 5 shown are directed toward a single collector diffuser duct 11. During the engine exhaust stroke, combustion gases flow sonicly from the ejector nozzles 5 across the intervening receiver volume 10 and enter the collector diffuser duct 11 where they are slightly compressed by the loss of their momentum in the slightly conical section of the collector diffuser duct 11. Air entrained from the receiver volume 10 by the momentum exchange of the impacting combustion gases are carried with combustion gas stream past the diffuser outlet 13 into a larger diameter exhaust duct 9. The sudden expansion of the combustion gases entering the exhaust duct 9 create pressure waves in the exhaust duct 9 causing a negative pressure at the collector diffuser duct outlet 13 causing air from receiver volume 10 to flow into the collector diffuser duct 11 and scavenge by its purging action residual exhaust gases remaining inn collector diffuser duct 11. By this action, fresh air is brought into the receiver volume 10 adjacent to ejector nozzle surface 4 for air-charging on the subsequent air induction cycle.

FIG. 4 is a cross-section of engine cylinder 1 and ejector housing 6 taken through the ejector nozzles 5 plane. In this figure the flow axes of injector nozzles 5 are obliquely parallel and are directed toward a single collector diffuser duct 11 which has been canted to receive their flow axially within the convergent section.

Figure 5:
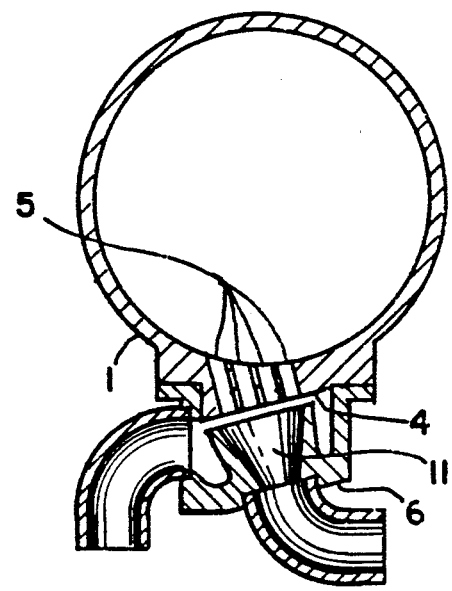
FIG. 5 is a cross-section of the engine cylinder and ejector through the ejector nozzles whose flow axes are obliquely parallel and whose exit places are perpendicular to the flow axis.

FIG. 5 is a cross-section of engine cylinder 1 and ejector housing 6 taken through the ejector nozzles 5 plane. FIG. 5 also shows obliquely parallel ejector nozzle 5 flow axes the same as FIG. 4. However, in FIG. 5 the ejector nozzle surface 4 has been canted such that the exit planes of ejector nozzles 5 are now perpendicular to their flow axes. The expansion of combustion gases past the perpendicular exit plane is uniform about the ejector nozzles 5 outlet and the direction of flow relative to the ejector nozzles 5 flow is not skewed delivering a more concentrated and vigorous flow to the collector diffuser duct 11.

Figure 6:
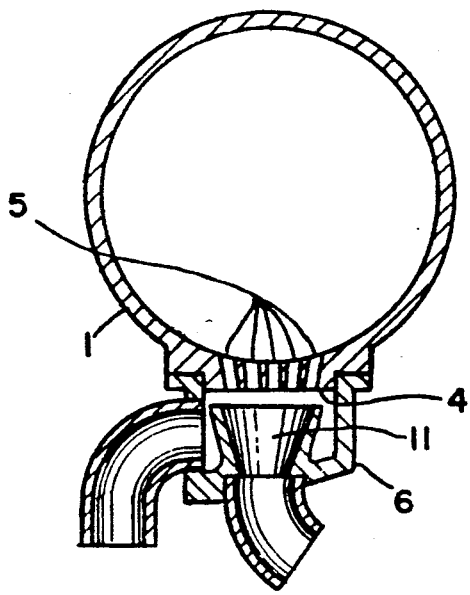
FIG. 6 is a cross-section of the engine cylinder and ejector through the ejector nozzles whose flow axes are obliquely impinging.
Figure 7:
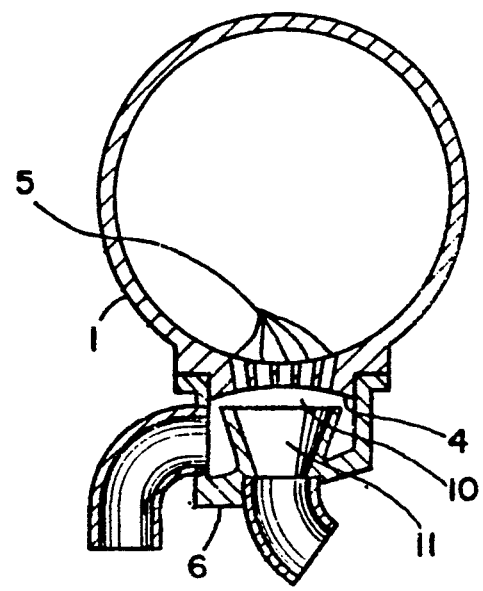
FIG. 7 is a cross-section of the engine cylinder and ejector through the ejector nozzles whose axes are obliquely parallel and whose exit planes are closely perpendicular to the flow axis.

FIG. 6 is a cross-section of engine cylinder 1 and ejector housing 6 taken through the ejector nozzles 5 plane. In this figure the flow axes of ejector nozzles 5 are obliquely impinging concentrating their flow toward the axial center of collector diffuser duct 11. The ejector system shown in FIG. 6 has five ejector nozzles 5 as compared to only four shown for FIGS. 3, 4 and 5. The flow axis of the center ejector nozzle 5 of FIG. 6 is directed along the axial center of the collector diffuser duct 11 and its exit place formed at ejector nozzle surface 4 is perpendicular to its flow axis. However, the exit planes of the remaining four ejector nozzles 5 are not perpendicular to their flow axes. All exit planes of the ejector nozzles 5 may be made closely perpendicular to their flow axes by forming the ejector nozzle surface 4 circularly concave inward such that each flow axis is perpendicular to the curved surface of FIG. 6 ejector nozzle surface 4. Curving ejector nozzle surface 4 concavely makes the expansion of combustion gas into receiver volume 10 more uniform and concentrates its flow within collector diffuser duct 11 making the ejector operation more efficient.

The collector diffuser duct 11, shown in FIGS. 3 through 7, convey an appearance of having a generally conical shape. These may however have a flattened inlet with a convergent transition to a circular collector diffuser duct outlet 13 as shown in FIG. 8. The area of inlet 14 of collector diffuser duct 11 is slightly larger than the area of the diffuser duct outlet 13 such that the flow toward the diffuser duct outlet 13 is slightly convergent.

The unique feature of this design is the collection of combustion gas flow from a plurality of ejector nozzles and its collection into a single collection diffuser duct.

What is claimed is:

1. An ejector comprising a receiver housing, a collection diffuser duct fixedly mounted within said receiver a plurality of ejector nozzles mounted on an engine cylinder, the flow axes of said ejector nozzles directed toward the inlet of said collection diffuser duct, an exhaust duct fixedly attached to said receiver housing and centered over the collection diffuser duct outlet, an air duct entering said receiver housing and opening into a receiver volume of said receiver housing.

2. The ejector of claim 1 in which the flow axes of said ejector nozzles are parallel.

3. The ejector of claim 1 in which the flow axes of said ejector nozzles are oblique and parallel.

4. The ejector of claim 1 in which the flow axes of the said ejector nozzles are oblique and parallel and their respective exit planes are perpendicular to the said flow axes.

5. The ejector of claim 1 in which the flow axes of the said ejector nozzles are oblique and impinging.

6. The ejector of claim 1 in which the flow axes of the said ejector nozzles are oblique and impinging and their respective exit planes are perpendicular to the said flow axes.

7. The ejector of claim 1 in which the flow axes of the said ejector nozzles is radial.

* * * * *